(12) United States Patent
Wang

(10) Patent No.: US 11,751,032 B2
(45) Date of Patent: *Sep. 5, 2023

(54) BLUETOOTH ENABLED SNAKE CAM

(71) Applicant: Pilot Inc., City of Industry, CA (US)

(72) Inventor: Calvin Shiening Wang, City of Industry, CA (US)

(73) Assignee: Pilot, Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,685

(22) Filed: May 26, 2020

(65) Prior Publication Data

US 2020/0359187 A1 Nov. 12, 2020

Related U.S. Application Data

(63) Continuation of application No. 15/495,506, filed on Apr. 24, 2017, now Pat. No. 10,667,105.

(51) Int. Cl.
*H04W 4/80* (2018.01)
*H04N 23/51* (2023.01)
*H04N 23/60* (2023.01)
*H04N 23/62* (2023.01)
(Continued)

(52) U.S. Cl.
CPC .............. *H04W 4/80* (2018.02); *H04N 23/51* (2023.01); *H04N 23/60* (2023.01); *H04N 23/62* (2023.01); *H04M 1/72412* (2021.01); *H04M 2250/52* (2013.01); *H04N 23/555* (2023.01)

(58) Field of Classification Search
CPC combination set(s) only.
See application file for complete search history.

(56) References Cited

U.S. PATENT DOCUMENTS

| 6,091,453 A | 7/2000 | Coan et al. |
| 6,770,027 B2 | 8/2004 | Banik et al. |
| 7,384,308 B2 | 6/2008 | Boehnlein et al. |

(Continued)

FOREIGN PATENT DOCUMENTS

| CN | 203786384 | 8/2014 |
| CN | 104382549 | 3/2015 |

OTHER PUBLICATIONS

"5MP WiFi Endoscope Camera [Advanced Version], 6X Zoomable Full HD Boroscope Inspection Camera Oiiwak Waterproof Semi-Rigid Snake Camera with Light for Android & iOS Smart Phone Tablets," Amazon.com, Inc., First Available Jul. 19, 2019, 5 pages [retrieved online from: www.amazon.in/Endoscope-Inspection-Oiiwak-Waterproof-Semi-Rigid/dp/B07N83GK8M].

(Continued)

*Primary Examiner* — Twyler L Haskins
*Assistant Examiner* — Fayez A Bhuiyan
(74) *Attorney, Agent, or Firm* — Sheridan Ross P.C.

(57) ABSTRACT

A snake cam is provided with a camera mounted to a housing via a shaft. The shaft may be flexible or rigid. The housing includes components needed for operation of the camera but that need not be in close physical proximity to the camera, thus allowing the camera itself to have a relatively small size, which facilitates placement thereof in small places. The housing may include a wireless communication module, through which a mobile device may be connected to the snake cam. The mobile device may then be used to access or control one or more features of the snake cam.

20 Claims, 5 Drawing Sheets

(51) Int. Cl.
*H04M 1/72412* (2021.01)
*H04N 23/50* (2023.01)

(56) References Cited

U.S. PATENT DOCUMENTS

| | | | |
|---|---|---|---|
| 8,514,278 B2* | 8/2013 | Karpen | A61B 1/128 |
| | | | 348/69 |
| 9,058,520 B2 | 6/2015 | Xie et al. | |
| 9,080,992 B2 | 7/2015 | Olsson et al. | |
| 9,179,051 B1* | 11/2015 | Stoudt | H04N 5/23299 |
| 9,693,024 B2 | 6/2017 | Schneider et al. | |
| 9,813,610 B2* | 11/2017 | Anderson | H04N 5/23216 |
| 9,970,881 B1 | 5/2018 | Hillman et al. | |
| 10,408,770 B2 | 9/2019 | Glover | |
| 10,667,105 B2 | 5/2020 | Wang | |
| 2005/0243173 A1 | 11/2005 | Levine et al. | |
| 2008/0064924 A1 | 3/2008 | Chen | |
| 2009/0309964 A1 | 12/2009 | Schrage | |
| 2010/0277578 A1 | 11/2010 | Mitchell | |
| 2013/0201356 A1 | 8/2013 | Kennedy et al. | |
| 2015/0321348 A1 | 11/2015 | Rollinson et al. | |
| 2015/0335227 A1* | 11/2015 | Jacobsen | A61B 1/00114 |
| | | | 600/110 |
| 2016/0150947 A1 | 6/2016 | Marmor et al. | |
| 2016/0334694 A1* | 11/2016 | Liu | A61B 1/00091 |
| 2017/0014020 A1 | 1/2017 | Tseng | |
| 2020/0053259 A1 | 2/2020 | Mueckl et al. | |

OTHER PUBLICATIONS

"M MHB Endoscope Series 2 WiFi Borescope 2 MP Inspection Camera Snake Camera for Android and iOS Smartphone,Tablet," Amazon.com, Inc., First Available Jan. 18, 2019, 5 pages [retrieved online from: https://www.amazon.in/MHB-Endoscope-Borescope-Inspection-Smartphone/dp/B07MY5YTM2/ref=sr_1_1?adgrpid=59646190995&dchild=1&ext_vrnc=hi&gclid=EAlaIQobChMl5f7rxpPb6glVzjUrCh1Z2wu6EAAYASAAEgJq4fD_BwE&hvadid=398042342590&hvdev=c&hvlocphy=1007747&hvnetw=g&hvqmt=b&hvrand=7129449398766320212&hvtargid=kwd-296772232970&hydadcr=19818_1971619&keywords=spy+snake+camera&qid=1595224827&sr=8-1&tag=googinhydr1-21].

"Wireless Inspection Camera, Advanced Wifi Endoscope, 1080P HD Snake Camera, Suitable for Smartphones, Apples, Samsung, Tablets," Amazon.com, Inc., First Available Feb. 22, 2019, 4 pages [retrieved online from: www.amazon.co.uk/Wireless-Inspection-Advanced-Endoscope-Smartphones/dp/B07P4LTLVG].

Otero "Top 11+ Best Endoscope Camera of 2020," Transit Wireless Wifi, updated Apr. 13, 2020, 32 pages [retrieved online from: transitwirelesswifi.com/best-endoscope-camera/].

Slatkin et al. "The Development of a Robotic Endoscope," Proceedings 1995 IEEE/RSJ International Conference on Intelligent Robots and Systems. Human Robot Interaction and Cooperative Robots, 1995, vol. 2, pp. 162-171.

Official Action for U.S. Appl. No. 15/495,506, dated Apr. 5, 2018 11 pages.

Official Action for U.S. Appl. No. 15/495,506, dated Nov. 2, 2018 12 pages.

Official Action for U.S. Appl. No. 15/495,506, dated Apr. 5, 2019 12 pages.

Official Action for U.S. Appl. No. 15/495,506, dated Oct. 4, 2019 11 pages.

Notice of Allowance for U.S. Appl. No. 15/495,506, dated Jan. 31, 2020 9 pages.

* cited by examiner

BLUETOOTH ENABLED SNAKE CAM

CROSS REFERENCE TO RELATED APPLICATIONS

This application is a continuation of U.S. application Ser. No. 15/495,506, filed on Apr. 24, 2017, now U.S. Pat. No. 10,667,105, which application is incorporated herein by reference in its entirety.

FIELD OF THE DISCLOSURE

The present disclosure relates to cameras, and more particularly to a flexibly mounted camera with wireless functionality.

BACKGROUND

The development of digital camera technology, the subsequent miniaturization of that technology, and the incorporation of digital cameras into smartphones has resulted in a massive proliferation of cameras, as well as a shift towards use of smartphone cameras rather than dedicated camera devices for capturing pictures and video. Smartphone cameras, however, and even more traditional digital cameras, have limited ability to capture images or video in tight spaces. Additionally, because cameras are typically fixed in position relative to smartphone or digital camera housing in which the camera is provided, such cameras may not be useful for capturing images of objects in tight spaces that do not allow the smartphone or digital camera housing to be oriented so as to bring the object(s) of interest into the camera's field of view.

SUMMARY

The present disclosure describes a snake cam including a housing and a camera mounted to the housing via a flexible shaft. By adjusting the flexible shaft, the camera is capable of taking pictures or recording video at any desired angle or orientation, regardless of the angle or orientation of the housing. In some embodiments, a snake cam comprises a wireless transceiver, such as a Bluetooth module, to allow the snake cam to transmit captured still images or video to an available receiver, whether for real-time viewing, for post-capture review, or for storage.

According to one embodiment of the present disclosure, a snake cam comprises a housing, a camera, and a flexible shaft. The housing comprises a processor; a wireless transceiver; at least one user interface element; and a memory. The camera is external to the housing, and the flexible shaft connects the camera to the housing.

The camera may comprise at least one light emitting diode. The at least one light emitting diode may provide a flash for the camera. The at least one light emitting diode can be turned on and off by a user of the snake cam. The camera may be configured to take pictures and record video. The at least one user interface element may include a display screen. The display screen may be configured as a viewfinder for the camera. The display screen may be a touchscreen, and the display screen may be used to adjust at least one feature or setting of the camera. The wireless transceiver may be configured to utilize a Bluetooth protocol.

According to another embodiment of the present disclosure, a snake cam system comprises a mobile device and a snake cam. The mobile device comprises a first processor, a first memory, and a display screen. The snake cam comprises a housing, a camera external to the housing, and a shaft connecting the camera to the housing. The housing comprises a second processor; a wireless transceiver; at least one user interface element; and a second memory. The snake cam is in wireless communication with the mobile device via the wireless transceiver.

The wireless communication may utilize a Bluetooth protocol. The shaft may be flexible or rigid. The first memory may store instructions for execution by the first processor that, when executed by the first processor, cause the first processor to transmit a control signal to the second processor, via the wireless transceiver, that causes the second processor to cause the camera to take a picture or record a video. The first memory stores a mobile application, the mobile application comprising a camera control module, an image storage module, and a viewer module.

According to yet another embodiment of the present disclosure, a camera device comprises a camera mounted on a first end of a flexible shaft, the camera comprising a lens and at least one LED light; and a housing connected to a second end of the flexible shaft, the housing comprising a processor, a memory, and a wireless transceiver configured to utilize a Bluetooth protocol. The memory stores instructions for execution by the processor that, when executed by the processor, cause the processor to control one of a plurality of functions. The plurality of functions include adjusting a zoom of the camera; switching the camera from a picture-taking mode to a video-recording mode; causing the camera to take a picture, to start recording a video, or to stop recording a video; and adjusting a focus of the camera.

The housing may comprise a user interface for causing the processor to control one of the plurality of functions. The processor may control one of the plurality of functions based on a signal received via the wireless transceiver. The LED light may operate as a flash for the camera. The plurality of function may further include transmitting a video feed from the camera via the wireless transceiver.

The terms "memory," "computer-readable medium" and "computer-readable memory" are used interchangeably and, as used herein, refer to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable medium is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
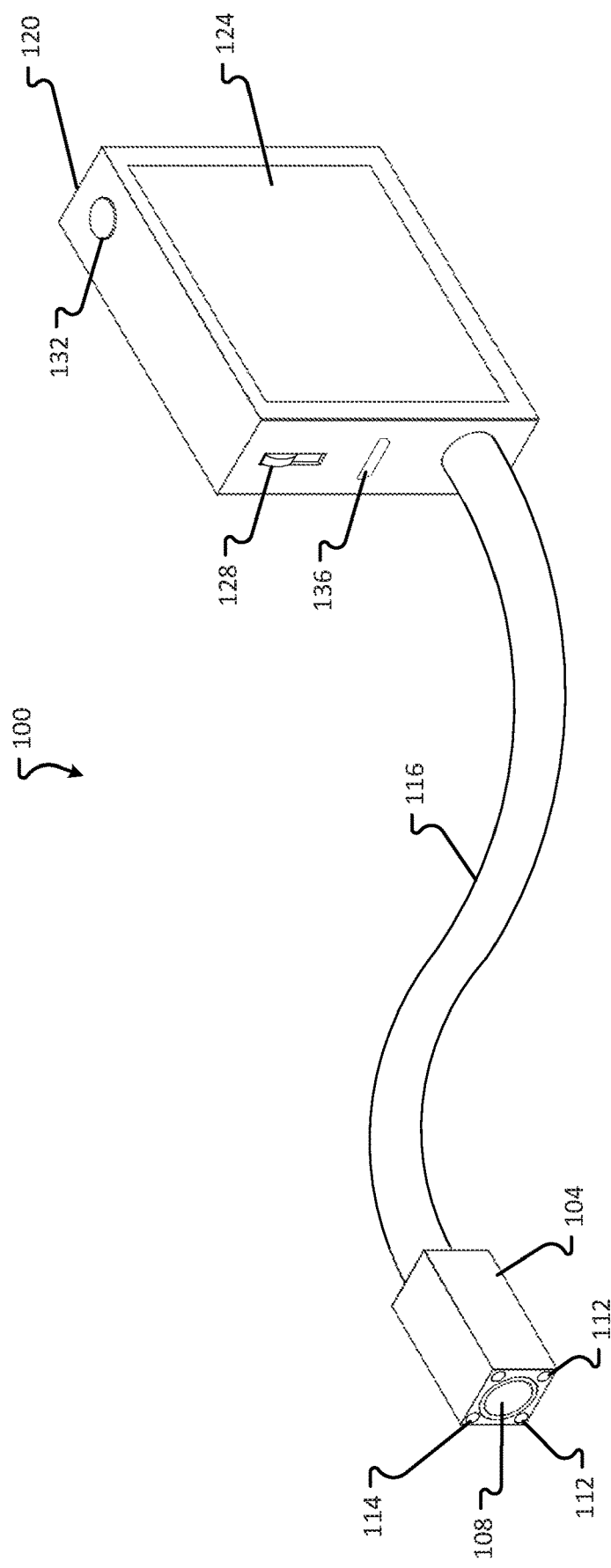
FIG. 1 depicts a snake cam according to one embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Referring first to FIG. 1, a snake cam 100 comprises a camera 104, a flexible shaft 116, and a housing 120. The camera 104 is a digital camera, and may use a CMOS image sensor or a CCD device to capture images and/or record video. The camera 104 includes a lens 108, and may comprise various features known to those of skill in the art, including for example optical zoom, digital zoom, autofocus, vignetting, optical aberration correction, and optical image stabilization. The camera 104 may be the same as or similar to a camera used in a mobile device. In some embodiments, the camera 104 may be capable of capturing only still photographs, while in other embodiments, the camera 104 may be capable of capturing both still and video images. Manufacturers of such cameras include, but are not limited to, Toshiba Corp., ST Microelectronics N.V., Sharp Corp., Omnivision Technologies, Inc., and ON Semiconductor.

The camera 104 also comprises at least one, if not a plurality of LED lights 112. The LED lights 112 may be configured to turn on automatically in low-light conditions (as detected, for example, by a light sensor included in the snake cam 100. The LED lights 112 may also be configured to be turned on and off by a user. In some embodiments, the LED lights 112 may provide a quick flash of light (e.g. when the camera 104 is used to take a picture), while in other embodiments the LED lights 112 may be configured to remain on for a longer period of time, whether to provide light for operation of the camera 104 (e.g. for capturing pictures or videos) or simply to act as a flashlight. In some embodiments, the LED lights 112 may be configured to emit light of a plurality of colors (e.g. of a plurality of wavelengths), which colors may or may not be selectable by a user of the snake cam 100. In other embodiments, the LED lights 112 may be configured to emit light of only one color (e.g. of only one wavelength).

In some embodiments, the camera 104 may comprise a microphone or other audio transducer 114. The microphone 114 may be useful, for example, to capture sound when recording a video or transmitting a live feed with the snake cam 100.

The flexible shaft 116 may be made of any material that allows the camera 104 to be repositioned relative to the housing 120, and for maintaining a particular orientation once placed in the particular orientation. The flexible shaft 116 may comprise metal, plastic, rubber, or any combination thereof. The flexible shaft 116 may be a single piece, or the flexible shaft 116 may comprise a plurality of pieces hingedly or otherwise adjustably connected one to another so as to impart flexibility to the shaft 116. The flexible shaft 116 may be hollow, so that one or more wires may pass therethrough to connect the camera 104 to one or more components within the housing 120. For example, a wire or cable may run through the flexible shaft 116 for use in sending electrical signals to and from the camera 104. As another example, a fiber-optic cable may run through the flexible shaft 116 from near an aperture of the camera 104 (or from near the lens of the camera 104) to a light sensor contained within the housing 120. The flexible shaft may be any desired length. For example, the flexible shaft may be six inches long, or a foot long, or two feet long, or four feet long, or ten feet long.

The flexible shaft 116 may significantly affect the utility of the snake cam 100. For example, the flexible shaft 116 may be long or short. The flexible shaft 116 may be used to hang the snake cam 100 over a rack, bar, beam, branch, hook, or other object. The flexible shaft 116 may be wrapped around a pole, tree, arm, or other object to hold the snake cam 100 to the object. The flexible shaft 116 may be extended into a hard- or impossible-to-reach place, such as into an air duct, behind or underneath furniture, into a crack or crevice, inside a computer housing, or elsewhere to obtain an image of an otherwise hard- or impossible-to-see object. The flexible shaft 116 renders the snake cam 100 useful in many areas of endeavor that require working in tight spaces, including plumbing; automobile, aircraft, or other machine repair; computer manufacture, service, and repair; electronics manufacturing and repair; and many others.

The housing 120 may be any manufacturable shape suitable for containing any components to be stored therein. Some shapes, such as a rectangular prism, may be particularly well-suited for embodiments of the snake cam 100 comprising a screen 124, although such a screen may also be mounted on a flat or curved surface of a different shape. The housing 120 contains various components associated with— and possibly even necessary for use of—the camera 104. Such components, many of which will be discussed in greater detail with respect to FIG. 2, may include the screen 124, an on/off switch 128, a button 132, and a port 136.

The screen 124 may accomplish several functions related to the camera 100. First, the screen 124 may be used as a viewfinder, so that a user of the camera 100 can see the subject matter captured within the field of view of the camera 124 and, if desired, take a picture or initiate or stop a video recording. The screen 124, which may be an LCD screen, an LED screen, an OLED screen, an AMOLED screen, a Super AMOLED screen, a TFT screen, an IPS screen, a TFT-LCD screen, or any other known variety of screen, may be a touchscreen, and may be used to present virtual buttons or other controls to a user. Such virtual buttons or controls may be useful, for example, for controlling optical or digital zoom or other camera features, for selecting whether to take a picture, stream a live video feed, and/or record a video; for capturing a screen shot of a recorded or live video; for controlling any LED lights 112 with which the snake cam 100 is equipped; and for accessing stored pictures and/or video.

The on/off switch 128 may be used to turn the snake cam 100 on or off. Although depicted here as a slider switch, the on/off switch 128 may comprise any other type of switch, including a button or toggle switch. In some embodiments, a snake cam 100 may comprise one or more additional on/off switches for such camera features as turning on or off a flash feature (e.g. using the LED lights 112 as a flash), turning on or off the LED lights 112 for use as a continuous light source/flashlight; turning on or off a wireless communication capability of the snake cam 100; and/or turning on or off the screen 124. Slider switches may also be provided for selecting one of two or more options associated with a camera feature. For example, a slider switch may be provided for selecting between or among any two or more of taking photos, recording video, and streaming a live video feed.

The button 132 may be used to trigger the shutter of the camera 104 (when capturing photographs) or to first open and then close the shutter of the camera 104 (when capturing or recording video). The button 132 (or similar buttons) may alternatively be used to control one or more other features of the snake cam 100, including to turn the snake cam 100 (or just the screen 124) on or off.

The port 136 may have one or more functions, including as a power port for connecting the snake cam 100 to an external power source (whether for powering normal operation of the snake cam 100 or for charging/recharging a battery of the snake cam 100), or for connecting a mobile device or an external storage device to the snake cam 100 (e.g. to download or otherwise offload pictures and/or videos from the snake cam 100, or for transmitting a live video feed to a connected mobile device, or for gaining access to additional controls and/or settings for the snake cam 100 via a connected mobile device, or to enable the snake cam 100 to access the Internet through a wireless transceiver of a connected mobile device). In some embodiments, connection of a mobile device to the snake cam 100 via the port 136 allows a screen of the mobile device to be used as a viewfinder for the camera 104, and further allows the mobile device to be used to control the operation of the camera 104. The port 136 may be a USB port, a Lightning port, a Firewire port, an Ethernet port, or any other port through which data and/or power may be transferred. Where the USB protocol is used, the wired communication port 124 may be one or more of Type A, Type B, Mini-A, Mini-B, Micro-A, and/or Micro-B ports. Additionally, the snake cam 100 may in some embodiments comprise a plurality of ports 136.

Figure 2:
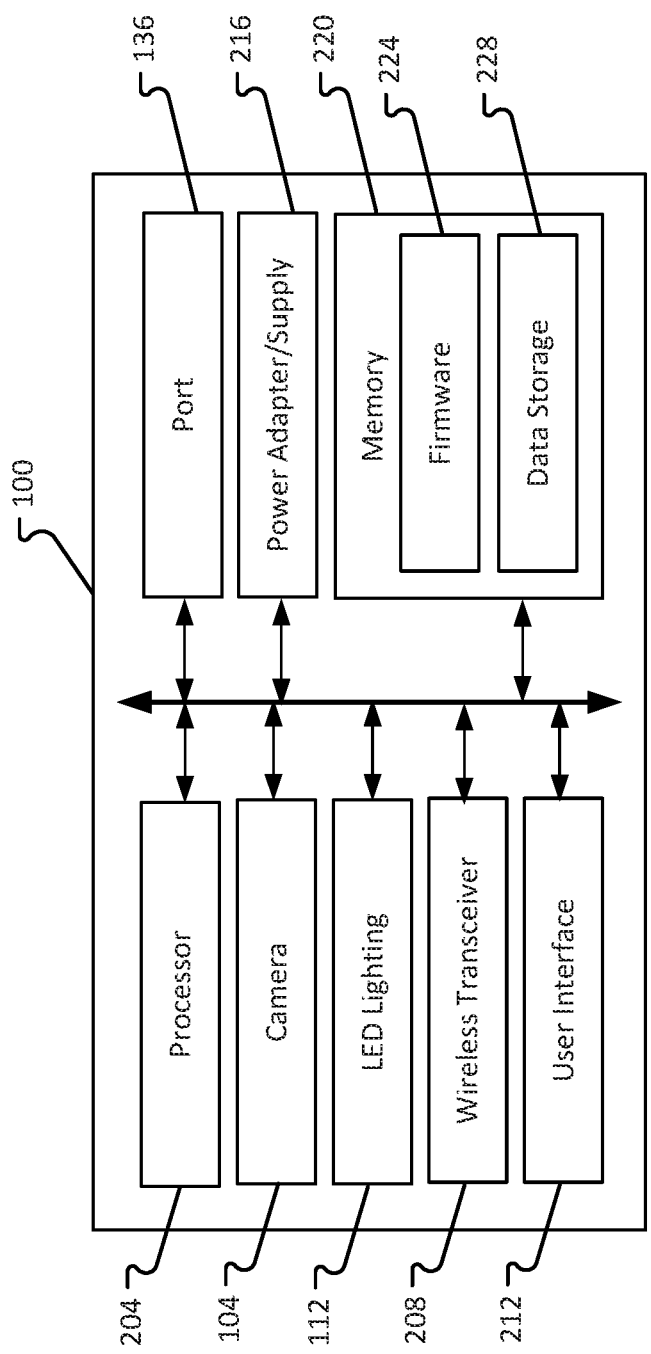
FIG. 2 is a block diagram of the snake cam according to the embodiment of FIG. 1.

FIG. 2 depicts a block diagram of the components of the snake cam 100. According to an embodiment of the present disclosure, the snake cam 100 comprises a processor 204, a camera 104, LED lighting 112, a wireless transceiver 208, a user interface 212, a port 136, a power adapter/supply 216, and a memory 220.

The processor 204 may correspond to one or multiple microprocessors that are contained within the housing 120 of the snake cam 100. The processor 204 may comprise a Central Processing Unit (CPU) on a single Integrated Circuit (IC) or a few IC chips. The processor 204 may be a multipurpose, programmable device that accepts digital data as input, processes the digital data according to instructions stored in its internal memory, and provides results as output. The processor 204 may implement sequential digital logic, as it has internal memory. As with most known microprocessors, the processor 204 may operate on numbers and symbols represented in the binary numeral system. The processor 204 may execute instructions stored in a firmware thereof, and may also execute instructions stored in the memory 220. The processor 204 may be used to control one or more aspects of one or more of the camera 104, the LED lighting 112, the wireless transceiver 208, the user interface 212, the port 136, and the power adapter/supply 216. The processor 204 may also be used to read data from or to write data to the memory 220.

The camera 104, the LED lighting 112, and the port 136 are described above in connection with FIG. 1.

The wireless transceiver 208 comprises hardware that allows the snake cam 100 to connect with a mobile device, such as a smartphone, tablet, or laptop, or with another computing or memory device equipped for wireless communications. The wireless transceiver 208 may in some embodiments enable the snake cam 100 to stream a live video feed to a connected device, and may further enable the snake cam 100 to transmit pictures to a connected device. Still further, the wireless transceiver 208 may enable the snake cam 100 to receive user input and/or commands from a mobile device, including to modify one or more settings of the snake cam 100, to cause the snake cam 100 to take a picture or to start or stop recording a video or transmitting a live video feed, or to capture a screenshot of a recorded video or live video feed; or otherwise to access or utilize one or more features of the snake cam 100.

The wireless transceiver 208 comprises a Bluetooth interface. In other embodiments of the present disclosure, the wireless transceiver 208 may comprise a Wi-Fi card, a Network Interface Card (NIC), a cellular interface (e.g., antenna, filters, and associated circuitry), a near field communication (NFC) interface, a ZigBee interface, a FeliCa interface, a MiWi interface, a Bluetooth interface, a Bluetooth low energy (BLE) interface, or the like. Regardless of the protocol used by the wireless transceiver 208, the wireless transceiver 208 may comprise, for example, a transmitter, a receiver, and an antenna, and may also comprise software or firmware needed to operate such components.

The user interface 212 may comprise one or more switches (such as the switch 128), buttons (such as the button 132), displays (such as the display 124), and/or other interface elements by which a user can control one or more features of the snake cam 100 and, in some embodiments, through which information may be provided by the snake cam 100 to the user. As discussed above, in some embodiments, for example, a slider switch 128 may be included on the snake cam 100 for controlling the flow of electricity from the power adapter/supply 216 to the processor 204, the camera 104, the wireless transceiver 208, and/or other components of the snake cam 100. A button 132 may be used for causing the camera 104 to take a picture, start or stop recording a video, start or stop transmitting a live video feed, or capture a screenshot of a recorded video or live video feed. The user interface 212 may further comprise one or more buttons, slider bars, other physical switches, or virtual controls (provided via a display such as the display 124) for controlling such aspects of the operation of the snake cam 100 as pairing or otherwise connecting the snake cam 100 to an external device via the wireless transceiver 208; zooming in or out with optical or digital zoom; turning image stabilization features on or off; selecting whether to use a display 124 or a connected mobile device or both as a viewfinder; and selecting whether to take a picture, capture a screenshot, record a video, or stream a live video feed. In some embodiments, the user interface 212 may comprise one or more LED lights on the housing 120 or the camera 104, which may illuminate in various patterns or sequences as controlled by the processor 204 to communicate various pieces of information to a user of the snake cam 100.

Although the foregoing description refers primarily to slider switches, buttons, and displays, any input devices may be included in the user interface 208 and used to control the functions of the snake cam 100, including switches, slider bars, toggles, rocker switches, rotary switches, rheostats, and potentiometers. The user interface 212 may comprise a keyboard. Additionally, non-mechanical input devices may be used instead of or in addition to mechanical devices. For example, the user interface 212 may comprise one or more touchscreens, which may display a plurality of virtual switches or controls. Similarly, the user interface 208 may include any output device, including but not limited to a screen and LED lights, for conveying relevant information from the snake cam 100 to a user thereof.

The power adapter/supply 216 may comprise circuitry for receiving power from an external source and accomplishing any signal transformation, conversion or conditioning needed to provide an appropriate power signal to the processor 204, the camera 104, and the other powered components of the snake cam 100. An external power source may be connected to the power adapter/supply 216 via the port 136 or via a dedicated power port of the power adapter/supply 216. Additionally or alternatively, the power adapter/supply 216 may comprise one or more batteries for supplying needed power to the snake cam 100. Such batteries may be used for normal operation, or such batteries may provide backup power (e.g. when power from an external source is not available). In embodiments comprising one or more batteries, the batteries may be removable and replaceable, and/or the batteries may be rechargeable. In embodiments with rechargeable batteries, the snake cam 100 may utilize the port 136 as a power inlet port, or the power adapter/supply 216 may comprise a dedicated charging port for recharging rechargeable batteries contained therein.

The memory 220 may comprise a firmware section 224 and a data storage section 228. The memory 220 may correspond to any type of non-transitory computer-readable medium. In some embodiments, the memory 220 may comprise volatile or non-volatile memory and a controller for the same. Non-limiting examples of memory 220 that may be utilized in the snake cam 100 include RAM, ROM, buffer memory, flash memory, solid-state memory, or variants thereof.

The firmware section 224 may store any electronic data (including instructions) needed for operation of the snake cam 100. For example, the memory 220 may store any firmware needed for allowing the processor 204 to operate and/or communicate with the various components of the snake cam 100, as needed, and to communicate with one or more mobile devices connected to the snake cam 100 via the wireless transceiver 208 or the port 136.

The data storage section 228 may store any electronic data corresponding to images captured, and videos recorded, by the snake cam 100. Such data may be regularly or intermittently downloaded or offloaded to a mobile device or external storage device connected to the snake cam 100 via the wireless transceiver 208 or the port 136, to ensure that the data storage section 228 maintains enough free space within the memory 220 to store newly captured photos or videos.

Figure 3:
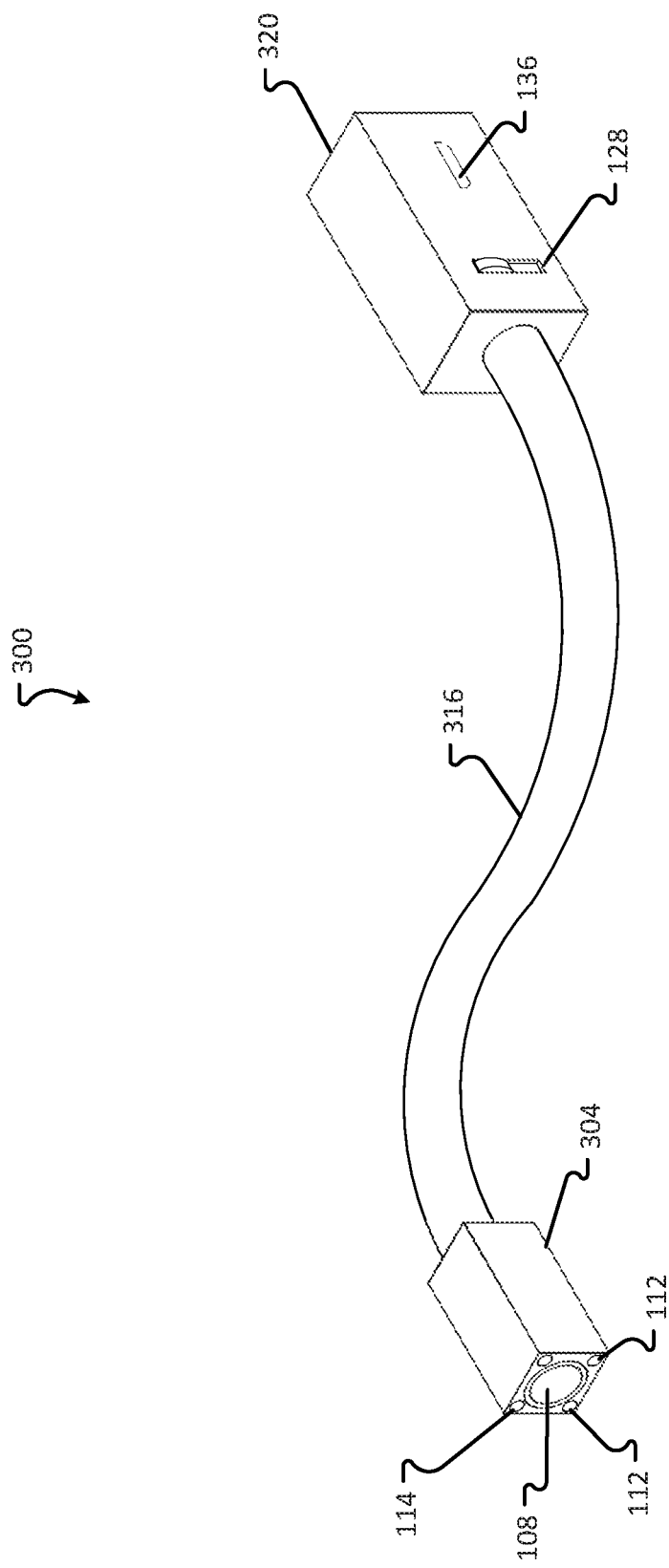
FIG. 3 depicts a snake cam according to another embodiment of the present disclosure.

With reference now to FIG. 3, a snake cam 300 according to another embodiment of the present disclosure comprises a camera 304, a flexible shaft 316, and a housing 320. The camera 304 may be the same as or similar to the camera 104, and may include a lens 108, one or more LED lights 112, and a microphone 114. The flexible shaft 316 may also be the same as or similar to the flexible shaft 116. The housing 320, on the other hand, may be substantially smaller than the housing 120, and may be configured with minimal user interface elements. One benefit of including fewer user interface elements is to enable the housing 320 to have a reduced size. For example, the housing 320 may comprise an on/off switch 128 and a port 136, but no other user interface elements. The snake cam 300 is intended to rely more heavily upon a connected device (whether a mobile device or other computing device, and whether connected via a port 136 or a wireless transceiver such as the wireless transceiver 208) to enable a user to use and control the snake cam 300. For example, while the snake cam 100 includes a screen 124 for use as a viewfinder for the camera 104 and possibly also for use in controlling one or more features of the snake cam 100, the snake cam 300 does not comprise a screen. Instead, a display of a connected device may be used as the viewfinder for the camera 304. Similarly, while the housing 120 includes a button 132 for activating the shutter of the camera 104 (or for starting or stopping a video recording or live video stream), the housing 320 does not include a control for the camera 304. Instead, a connected device may be used to send commands to the camera 304, via a wireless transceiver of the snake cam 300, to take a picture or to start or stop a video recording or a live video feed. These are just examples of some of the features that may be excluded from the snake cam 300 and instead accessed, activated, or otherwise controlled using a connected device. In various embodiments of the present disclosure, one or more of the foregoing elements may be included with the housing 320, while in other embodiments, these or other elements may be excluded from the housing 320.

While the snake cam 300 generally includes fewer user interface elements than the snake cam 100, the snake cam 300 may nevertheless include most or all of the other components of the snake cam 100 as depicted in FIG. 2. For example, the snake cam 300 may comprise a processor 204, a camera 104, LED lighting 112, a wireless transceiver 208, minimal user interface elements 212 as discussed above, a port 136, a power adapter/supply 216, and a memory 220, each of which may be the same as or similar to the corresponding components of the snake cam 100.

Figure 4:
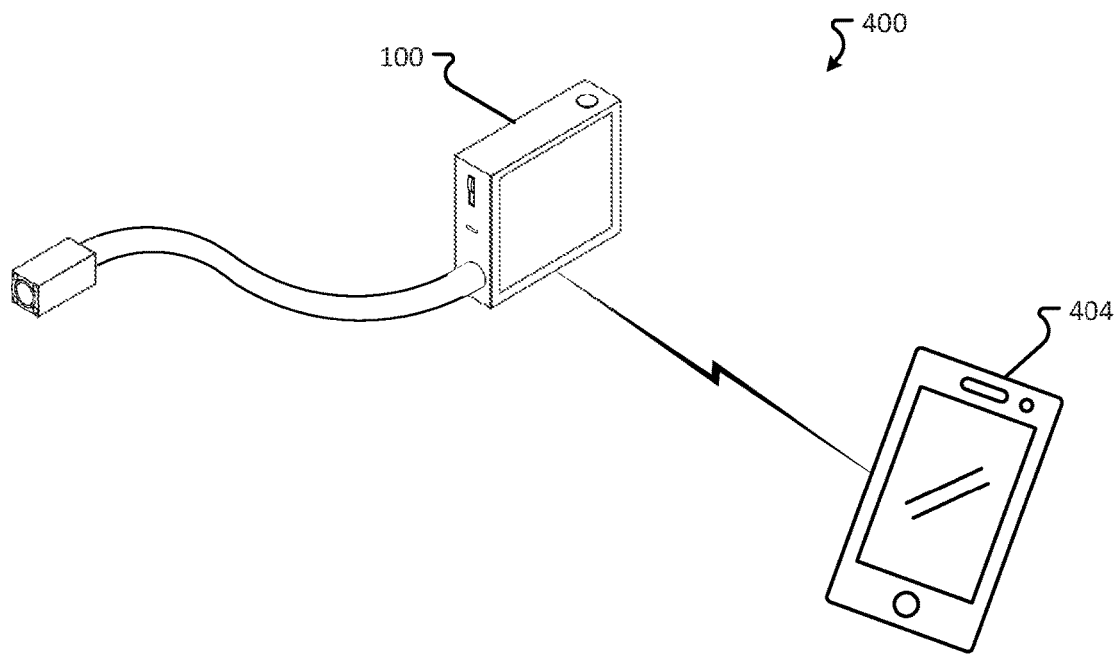
FIG. 4 depicts a system comprising the snake cam of FIG. 1 in wireless communication with a mobile device.

Referring now to FIG. 4, a system 400 according to an embodiment of the present disclosure may comprise a snake cam 100 that has been wirelessly paired or otherwise connected with a mobile device 404. In one example, the mobile device 404 may be used to receive a live video feed from the snake cam 100, or to receive a photograph taken by the snake cam 100 and transmitted via the wireless transceiver 208. Additionally, the mobile device 404 may provide a link between the snake cam 100 and the Internet, so that a live video feed can be streamed to the Internet. Other aspects of the operation of the snake cam 100 may be controlled directly through the snake cam 100, and more particularly through the user interface 212 thereof.

In another example, the mobile device 404 may be used in addition to or instead of the user interface 212 of the snake cam 100 to control one or more features of the snake cam 100. The mobile device 404 may be used, for example, to select whether activation of the button 132 will cause the snake cam 100 to take a picture, record a video, or stream a live video feed; to cause the snake cam 100 to take a picture, record a video, stream a live video feed, or capture a screenshot of a recorded video or live video feed; to control whether the LED lights 112 are used as a flash for the camera 104, as a flashlight, or are turned off altogether; to control the zoom of the camera 104; to control the focus of the camera 104; as a viewfinder for the camera 104; to manage the data storage section 228 of the snake cam 100; and to access, control or adjust any other feature or setting of the snake cam 100.

Figure 5:
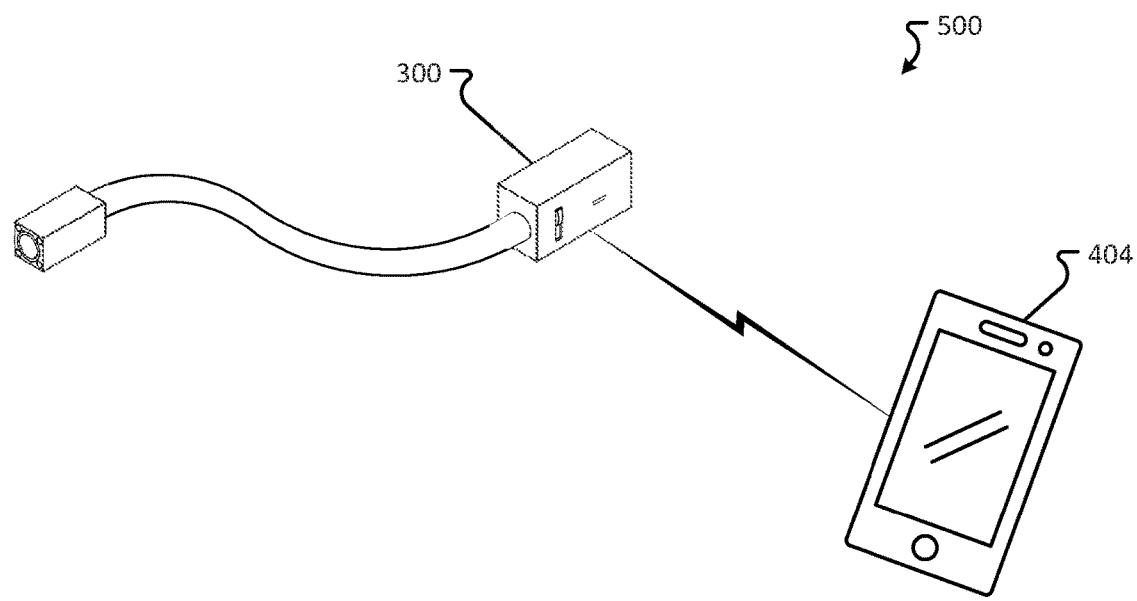
FIG. 5 depicts a system comprising the snake cam of FIG. 3 in wireless communication with a mobile device.

Turning now to FIG. 5, a system 500 according to another embodiment of the present disclosure may comprise a snake cam 300 that has been wirelessly connected or paired with a mobile device 404. Unlike with the system 400, because the snake cam 300 comprises fewer user interface elements than the snake cam 100, the various features of the snake cam 300 cannot be accessed or controlled from the snake cam 300 itself. Instead, the snake cam 300 is controlled almost entirely through the mobile device, which is connected to the snake cam 300 via a wireless transceiver 208. (Although, in some embodiments, the mobile device 404 may be connected to the snake cam 300 via the port 136.) Thus, in the system 500, the mobile device 404 is used, for example, to select whether to take a picture, record a video, stream a live video feed, or capture a screenshot of a recorded video or live video feed; to cause the snake cam 100 to take a picture, record a video, stream a live video feed, or capture a screenshot of a recorded video or live video feed; to control whether the LED lights 112 are used as a flash for the camera 304, as a flashlight, or are turned off altogether; to control the zoom of the camera 304; to control the focus of the camera 304; as a viewfinder for the camera 304; to manage the data storage section 228 of the snake cam 300; and to control or adjust any other feature or setting of the snake cam 300.

Figure 6:
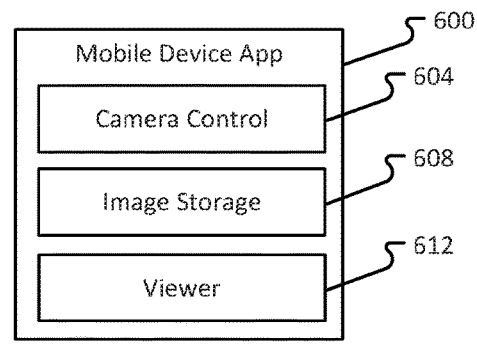
FIG. 6 depicts a block diagram of an application for execution on a mobile device connected to a snake cam according to some embodiments of the present disclosure.

FIG. 6 is a block diagram of a mobile device application 600 according to an embodiment of the present disclosure. The mobile device application 600 may be stored in a memory of a mobile device 404, and may comprise instructions for execution by a processor of the mobile device 404. In particular, the mobile device application 600 may store instructions in three modules: a camera control module 604, an image storage module 608, and a viewer module 612.

The camera control module 604 may comprise instructions for execution by the processor of the mobile device that, when executed, cause the mobile device processor to present, to a user of the mobile device 404 and through a display of the mobile device 404, a graphical user interface through which the user can access or control one or more features of a connected snake cam 100 or 300. For example, the camera control module 604 may allow the user to control, via the mobile device, any of the features described herein, or any other camera features configured to be controlled by the user. Additionally, the camera control module 604 may allow the user to operate a connected snake cam 100 or 300, including by causing the camera 104 or 304 to take a picture, record a video, stream a live feed, or capture a screenshot of a recorded video or live video feed. The camera control module 604 may also allow the display of the mobile device 404 to be used as a viewfinder for the camera 104 or 304.

The image storage module 608 may comprise instructions for execution by the mobile device processor that, when executed, cause the mobile device processor to present to the user, via the display of the mobile device 404, a graphical user interface through which the user can control the storage of images (whether pictures or video) captured by the snake cam 100 or 300. The image storage module 608 may be configured, for example, to allow a user to select a storage location for images captured by the snake cam 100 or 300, or to allow a user to move an image file from one location to another. The available storage locations may be locations in the memory of the mobile device, or they may be locations in the memory of the snake cam 100 or 300, or they may be locations in the memory of a device connected to the snake cam 100 or 300 via a port 136, or they may be locations accessible via a Wi-Fi, cellular, or other network connection.

The viewer module 612 may comprise instructions for execution by the mobile device processor that, when executed, cause the mobile device processor to present to the user, via the display of the mobile device 404, a graphical user interface through which the user can view a live video feed from the snake cam 100 or 300, and/or a captured image (whether a picture or a video) stored in the memory of the snake cam 100 or 300, in a memory of the mobile device 404, in a memory attached to the snake cam 100 or 300 via a port 136, or in a memory accessible via a network connection.

Although described separately, the camera control module 604, the image storage module 608, and the viewer module 612 may comprise interdependent instructions that, when executed by a mobile device processor, result in the presentation to the user via a display of the mobile device 404 of a graphical user interface through which the specific functions of each of the modules 604, 608, and 612 may be accessed. For example, in some embodiments the viewer module 612 may include instructions for allowing a user to use the mobile device 404 as a viewfinder for a connected snake cam 100 or 300, while the camera control module 604 may include instructions for allowing a user to cause the camera 104 or 304 of a connected snake cam 100 or 300 to zoom in or out, while the display of the mobile device 404 is still being used as a viewfinder.

Figure 7:
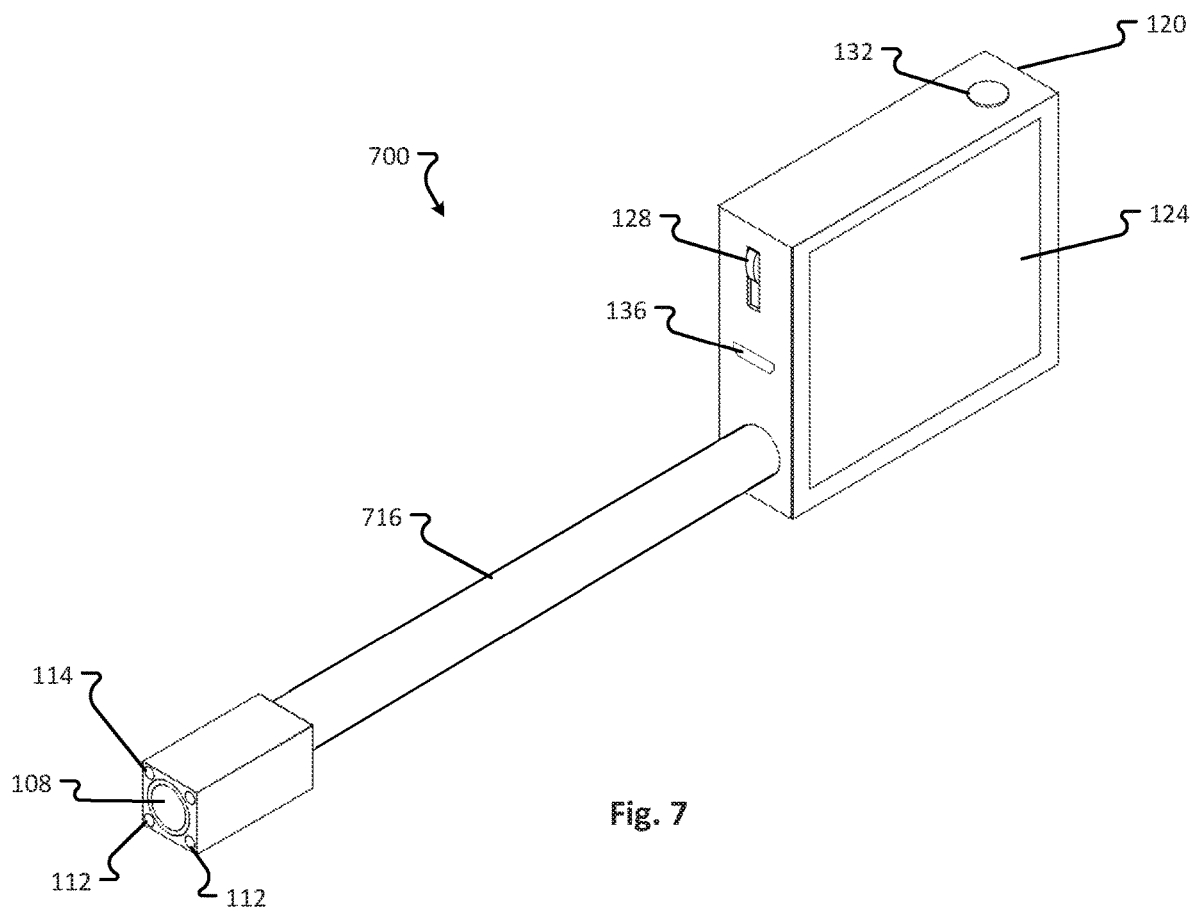
FIG. 7 depicts a snake cam according to yet another embodiment of the present disclosure.

FIG. 7 depicts a snake cam 700 according to yet another embodiment of the present disclosure. The snake cam 700 may comprise components that are the same as or similar to the components of the snake cam 100 or 300. For example, the snake cam 700 may comprise a camera 104 (or 304), including a lens 108, one or more LED lights 112, and a microphone 114; and a housing 120 or 320. As shown, the snake cam 700 comprises a housing 120, including a display or screen 124, an on/off slider switch 128, a button 132, and a port 136. However, the snake cam 700 may also comprise a housing 320 that does not include a button 132, a display 124, or one or more other features of the housing 120.

The primary difference between the snake cam 700 and the snake cams 100 and 300 is that the snake cams 100 and 300 have flexible shafts 116, while the snake cam 700 comprises a fixed shaft 716. The fixed shaft 716 may be extendible (whether in a telescoping fashion, an accordion fashion, or otherwise), but is not intended to be bent. The fixed shaft 716 may be made of plastic, metal or any other substantially rigid material. The fixed shaft 716 beneficially allows a user of the snake cam 700 to ensure that the camera 104 or 304 remains in a substantially fixed location relative to the housing 120 or 320, which may not be possible with the flexible shaft 116. For example, a snake cam 100 or 300 with a flexible shaft 116 may not be well-suited for use in an obstacle-rich environment where the camera 104 or 304, or the shaft 116, may contact an obstacle while the snake cam 100 or 300 is being moved into position, which may cause a shaft 116 to move relative to the housing 120 or 320. However, a snake cam 700 with a substantially rigid shaft 716 may be less likely to move into a different position as a result of such a contact.

In some embodiments of the present disclosure, the camera 104 or 304, or at least an operative portion thereof, may be adjustably mounted to the flexible shaft 116 or to the rigid shaft 716, so that the orientation of the camera relative to the flexible shaft 116 or rigid shaft 716 may be adjusted. Additionally, one or more servos and/or actuating rods may be operatively connected to the camera 104 or 304, or to one or more internal components of the camera 104 or 304, so as to allow for remote movement of the camera 104 or 304. Such remote movement may be commanded through a user interface of the housing 120, or through a mobile device that is in wireless or wired communication with a housing 120 or 320. This feature, where included in embodiments of the present disclosure, beneficially allows a user of a snake cam 100, 300, or 700 to pan, tilt, and/or rotate the camera 104 or 304 while the snake cam 100, 300, or 700 is being used, without having to remove the snake cam 100, 300, or 700 from its place of use and without having to move the housing 120 or 320. This feature may be particularly helpful, for example, when the snake cam 100, 300, or 700 is being used to search for an object in a difficult-to-access location, as a user can place the snake cam 100, 300, or 700 in position and then pan, tilt, rotate, or otherwise manipulate the position of the camera 104 or 304 without having to repeatedly remove the snake cam 100 or 300 and manually readjust the camera 104 or 304.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJ-S™ processorss. A processor as disclosed herein may perform computational functions using any known or future-developed standard, instruction set, libraries, and/or architecture.

I claim:

1. A snake cam comprising:
   a camera comprising one or more servos operably connected to the camera;
   a housing comprising:
      a processor;
      a wireless transceiver;
      at least one user interface element; and
      a memory storing instructions for execution by the processor that, when executed, cause the processor to:
         control at least one of a zoom or a focus of the camera; and
         control the one or more servos to remotely move the camera;
   a flexible shaft connecting the camera to the housing, the flexible shaft comprising a plurality of pieces hingedly connected to one another;
   at least one light emitting diode;
   a light sensor configured to automatically control the at least one light; and
   a display screen configured to display one or more controls for controlling the at least one light emitting diode.

2. The snake cam of claim 1, wherein the at least one light emitting diode provides a flash for the camera.

3. The snake cam of claim 1, wherein the at least one light emitting diode can be turned on and off by a user of the snake cam.

4. The snake cam of claim 1, wherein the camera is configured to take pictures and record video.

5. The snake cam of claim 1, wherein the at least one user interface element includes a display screen.

6. The snake cam of claim 5, wherein the display screen is configured as a viewfinder for the camera.

7. The snake cam of claim 5, wherein the display screen is a touchscreen, and further wherein the display screen can be used to adjust at least one feature or setting of the camera.

8. The snake cam of claim 1, wherein the wireless transceiver is configured to utilize a Bluetooth protocol.

9. A snake cam system, comprising:
   a mobile device comprising a first processor, a first memory, and a display screen; and
   a snake cam comprising:
      a camera comprising one or more servos operably connected to the camera;
      a housing comprising:
         a second processor;
         a wireless transceiver;
         at least one user interface element;
         a second memory storing instructions for execution by the second processor that, when executed, cause the second processor to:
            control at least one of a zoom or a focus of the camera; and
            control the one or more servos to remotely move the camera;
      a flexible shaft connecting the camera to the housing, the flexible shaft comprising a plurality of pieces hingedly connected to one another; and
      at least one light emitting diode; and
      a display screen configured to display one or more controls for controlling the at least one light emitting diode,
   wherein the snake cam is in wireless communication with the mobile device via the wireless transceiver.

10. The snake cam system of claim 9, wherein the wireless communication utilizes a Bluetooth protocol.

11. The snake cam system of claim 9, wherein the shaft is hollow.

12. The snake cam system of claim 9, wherein the shaft comprises at least one of metal, plastic, and rubber.

13. The snake cam system of claim 9, wherein the first memory stores instructions for execution by the first processor that, when executed by the first processor, cause the first processor to:
   transmit a control signal to the second processor, via the wireless transceiver, that causes the second processor to cause the camera to take a picture or record a video.

14. The snake cam system of claim 9, wherein the first memory stores a mobile application, the mobile application comprising a camera control module, an image storage module, and a viewer module.

15. A camera device comprising:
   a camera mounted on a first end of a flexible shaft, the camera comprising a lens and at least one LED light; and
   a housing connected to a second end of the flexible shaft, the housing comprising a processor, a memory, and a wireless transceiver configured to utilize a Bluetooth protocol,
   wherein the memory stores instructions for execution by the processor that, when executed by the processor, cause the processor to control one of a plurality of functions, the plurality of functions including:
      adjusting a zoom of the camera;
      switching the camera from a picture-taking mode to a video-recording mode;
      causing the camera to take a picture, to start recording a video, or to stop recording a video; and
      adjusting a focus of the camera.

16. The camera device of claim 15, wherein the housing comprises a user interface for causing the processor to control one of the plurality of functions.

17. The camera device of claim 15, wherein the processor controls one of the plurality of functions based on a signal received via the wireless transceiver.

18. The camera device of claim 15, wherein LED light operates as a flash for the camera.

19. The camera device of claim 15, wherein the plurality of functions further includes:
   transmitting a video feed from the camera via the wireless transceiver.

20. A snake cam system, comprising:
   a mobile device comprising a first processor, a first memory, and a display screen; and
   a snake cam comprising:
      a camera comprising one or more servos operably connected to the camera;
      a housing comprising:
         a second processor;
         a wireless transceiver;
         at least one user interface element; and
         a second memory storing instructions for execution by the second processor that, when executed, cause the second processor to:
            control at least one of a zoom or a focus of the camera; and
            control the one or more servos to remotely move the camera;
      a flexible shaft connecting the camera to the housing, the flexible shaft comprising a plurality of pieces hingedly connected to one another;
      at least one light emitting diode; and
      a display screen configured to display one or more controls for controlling the at least one light emitting diode,
   wherein the snake cam is in wireless communication with the mobile device via the wireless transceiver.

* * * * *